United States Patent
Khan et al.

(10) Patent No.: US 12,011,971 B2
(45) Date of Patent: Jun. 18, 2024

(54) AUTOMATIC AIR INTAKE SEALING

(71) Applicant: Rivian IP Holdings, LLC, Plymouth, MI (US)

(72) Inventors: Sameh Khan, Ann Arbor, MI (US); Graham Lloyd Feltham, Garden City, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 267 days.

(21) Appl. No.: 17/380,146

(22) Filed: Jul. 20, 2021

(65) Prior Publication Data
US 2023/0022336 A1 Jan. 26, 2023

(51) Int. Cl.
*B60H 1/00* (2006.01)
*B60H 1/28* (2006.01)
*B60S 1/08* (2006.01)

(52) U.S. Cl.
CPC ..... *B60H 1/00785* (2013.01); *B60H 1/00485* (2013.01); *B60H 1/00835* (2013.01); *B60H 1/28* (2013.01); *B60S 1/0822* (2013.01)

(58) Field of Classification Search
CPC ............ B60H 1/00021; B60H 1/00485; B60H 1/00785; B60H 1/00835; B60H 1/28; B60H 2001/00085; B60S 1/0822
See application file for complete search history.

(56) References Cited

U.S. PATENT DOCUMENTS

| | | | | |
|---|---|---|---|---|
| 5,729,989 A * | 3/1998 | Sunaga | ............... | B60H 1/00785 165/204 |
| 5,934,987 A * | 8/1999 | Baruschke | ............. | B60H 1/008 165/223 |
| 6,800,022 B2 * | 10/2004 | Urbank | .................. | B60H 1/008 454/75 |
| 7,210,523 B2 * | 5/2007 | Umebayashi | ...... | B60H 1/00842 62/133 |

(Continued)

FOREIGN PATENT DOCUMENTS

| | | |
|---|---|---|
| DE | 2941305 C2 | 4/1980 |
| DE | 4234045 C1 | 10/1993 |

(Continued)

OTHER PUBLICATIONS

Aug. 10, 2022 German Office Action issued in corresponding Application No. 102021215082.9.

*Primary Examiner* — Tyler J Lee
(74) *Attorney, Agent, or Firm* — BAKERHOSTETLER (57) ABSTRACT

Disclosed embodiments include airflow systems, vehicles, and controllers of airflow units. An illustrative airflow system of a vehicle includes an airflow inlet duct, an airflow intake duct, an air intake door, and an airflow unit. The airflow inlet duct is adapted to draw ambient air. The airflow intake duct is adapted to receive airflow from the airflow inlet duct. The air intake door is positioned therebetween. The airflow unit includes a controller configured to close the air intake door and seal off the air intake duct from the airflow inlet duct in response to receipt of at least one signal (Continued)

indicating at least one condition chosen from 1) a presence of water in the airflow inlet duct, 2) a hood of the vehicle being in an open condition, 3) a presence of rain received from a precipitation sensor, and 4) activation of a predetermined speed setting of a windshield wiper.

20 Claims, 5 Drawing Sheets

(56) References Cited

U.S. PATENT DOCUMENTS

| | | | |
|---|---|---|---|
| 9,434,235 B2 * | 9/2016 | Eisenhour | B60H 1/00849 |
| 2015/0151606 A1 * | 6/2015 | Harke | B60H 1/00321 |
| | | | 165/104.11 |
| 2019/0232755 A1 * | 8/2019 | Buckman | B60H 1/00735 |
| 2022/0134870 A1 * | 5/2022 | Naveed | F02M 35/0204 |
| | | | 180/68.1 |

FOREIGN PATENT DOCUMENTS

| | | |
|---|---|---|
| DE | 19810861 A1 | 9/1999 |
| DE | 102013211847 A1 | 1/2014 |
| DE | 102012022552 A1 | 5/2014 |

* cited by examiner

AUTOMATIC AIR INTAKE SEALING

INTRODUCTION

The present disclosure relates to stopping cabin water intrusion. Airflow systems, such as heating/ventilation/air conditioning (HVAC) systems incorporate a fresh-air mode to maintain cabin air quality ($CO_2$ levels, smells, fumes, etc) and humidity (people breathing inside the car builds up humidity which can fog the windows). However, use of fresh-air puts the cabin dry-zone at risk of ingesting significant levels of liquid water under heavy loading conditions.

For example, water may be ingested into fresh-air intakes and passed through to an HVAC intake, thereby allowing the water to intrude into the cabin. In addition, under water loading scenarios, opening body closures, such as the doors, the trunk, and/or the hood of the vehicle may cause water resting on those closures to fall into various air intakes. Further, under certain water loading scenarios, such as torrential rain and certain car-wash situations, it is physically possible for water to penetrate into the cabin dry-zone of a vehicle through the fresh-air intake of an airflow system of the cabin. In these scenarios that other water management systems, such as one-way drain valves, of the intake duct at the vehicle cowl may potentially be overloaded to the point where water is able to enter the cabin.

BRIEF SUMMARY

Various disclosed embodiments include illustrative controllers, airflow systems, and vehicles.

In an illustrative embodiment of the present disclosure, an airflow system of a vehicle is disclosed. The airflow system includes an airflow inlet duct, an airflow intake duct, an air intake door, and an airflow unit. The airflow inlet duct is adapted to draw an airflow of ambient air. The airflow intake duct is adapted to receive the airflow from the airflow inlet duct. The air intake door positioned in a flow path of the airflow between the airflow inlet duct and the airflow intake duct. The airflow unit is adapted to receive the airflow from the airflow intake duct. The airflow unit includes a controller configured to close the air intake door and seal off the air intake duct from the airflow inlet duct in response to receipt of at least one signal indicating at least one condition chosen from 1) a presence of water in the airflow inlet duct, 2) a hood of the vehicle being in an open condition, 3) a presence of rain detected by a precipitation sensor, and 4) activation of a predetermined speed setting of a windshield wiper.

In another illustrative embodiment of the present disclosure, a vehicle is disclosed. The vehicle includes a hood, a cowl, an airflow inlet duct, an airflow intake duct, an air intake door, and an airflow unit. The cowl is adjacent to the hood. The airflow inlet duct is adapted to draw an airflow of ambient air from the cowl. The airflow intake duct is adapted to receive the airflow from the airflow inlet duct. The air intake door is positioned in a flow path of the airflow between the airflow inlet duct and the airflow intake duct. The airflow unit is adapted to receive the airflow from the airflow intake duct. The airflow unit includes a controller configured to close the air intake door and seal off the air intake duct from the airflow inlet duct in response to receipt of at least one signal indicating at least one condition chosen from 1) a presence of water in the airflow inlet duct, 2) the hood being in an open condition, 3) a presence of rain detected by a precipitation sensor of the vehicle, and 4) activation of a predetermined speed setting of a windshield wiper of the vehicle.

In another illustrative embodiment of the present disclosure, a controller of an airflow unit is disclosed. The controller includes a processor and memory. The memory stores computer-executable instructions that, when executed, cause the processor to: receive at least one signal indicating a presence of water in an airflow inlet duct of a vehicle, the airflow inlet duct adapted to draw an airflow of ambient air; and in response to the receipt of the signal, close an air intake door positioned between the airflow inlet duct and an air intake duct of the airflow unit to seal off the air intake duct from the airflow inlet duct.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Given by way of non-limiting overview, various disclosed embodiments include illustrative controllers, airflow systems, and vehicles. Given by way of non-limiting example provided by way of illustration only, the present disclosure provides, among other illustrative embodiments, an airflow system of a vehicle that is configured to reduce the risk of water intrusion into the cabin through a fresh-air intake, such as, for example, at openings that use foams to seal the airflow intake. In particular, the airflow system is configured to close an air intake door to seal the cabin from the fresh-air intake under a condition that may lead to an ingestion of water into the cabin dry-zone, such as under a condition that will overload other water management features of the fresh-air intake ducting. The airflow system can thus automatically protect the cabin dry-zone when needed, while generally allowing full normal function of fresh-air mode for the occupants.

As will be described in greater detail below, in various embodiments the condition(s) may include at least one of a presence of water in the airflow inlet duct, the hood of the vehicle being in an open condition, a presence of rain detected by a precipitation sensor of the vehicle, and activation of a predetermined speed setting of a windshield wiper of the vehicle. By sealing the cabin from the fresh-air intake ducting upon detection of one or more of these conditions, the risk of water intrusion can be reduced by sealing the cabin from the fresh-air intake ducting before water entering the fresh-air intake ducting is sufficient enough to potentially be ingested at an intake of the airflow system, which can help contribute to reducing the possibility of water entering the cabin via the airflow system. Further, by reducing the risk of water intrusion via the sealing of the cabin from the fresh-air intake, a length of the fresh-air intake can be reduced. This reduction can help contribute to resulting in a reduction of a mass of the system and can free up space within the vehicle for other components as a more circuitous fresh-air intake is not needed to reduce water intrusion into the cabin dry-zone.

Figure 1:
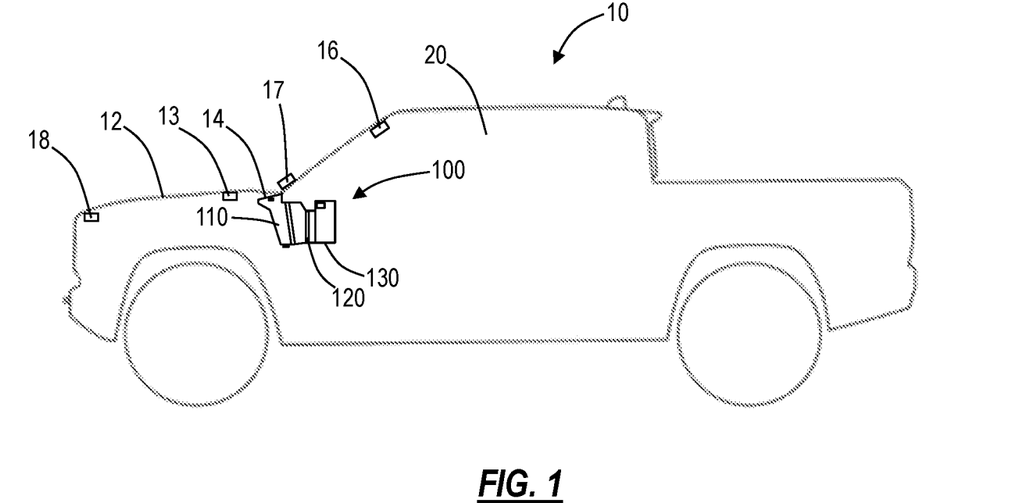
FIG. 1 is a schematic illustration of an illustrative embodiment of a vehicle of the present disclosure, highlighting an airflow system thereof.

Referring to FIG. 1, in various illustrative embodiments a vehicle 10 includes a cabin 20, a hood 12, a cowl 14, and an airflow system 100. The cabin 20 is adapted to receive vehicle occupants, while the airflow system 100 is generally adapted to provide comfort to the vehicle occupants. In various embodiments, the airflow system 100 is adapted to provide fresh and/or conditioned air to the cabin 20 for the vehicle occupants. In various embodiments, the airflow system 100 is an HVAC system, which can be used both while the vehicle is occupied and unoccupied, such as during preconditioning of the vehicle and electronics overheat protection of the vehicle.

In various embodiments, the hood 12 provides access to a storage space of the vehicle 10 and the cowl 14 is positioned adjacent to the hood 12. As such, while the hood 12 is in an open condition, the hood 12 may be angled toward the cowl 14. In various embodiments, the vehicle also includes a hood sensor 13 that is adapted to detect whether the hood 12 is in an open condition or a closed condition and is adapted to send a signal identifying whether the hood 12 is in the open condition or the closed condition.

In various embodiments, the vehicle 10 includes a precipitation sensor 16 that is adapted to detect the presence of rain. In various illustrative embodiments, the precipitation sensor 16 is a rain-light sensor that is adapted to both detect if rain is present (a logical) and detect an amount of rain present (scalar).

Figure 2:
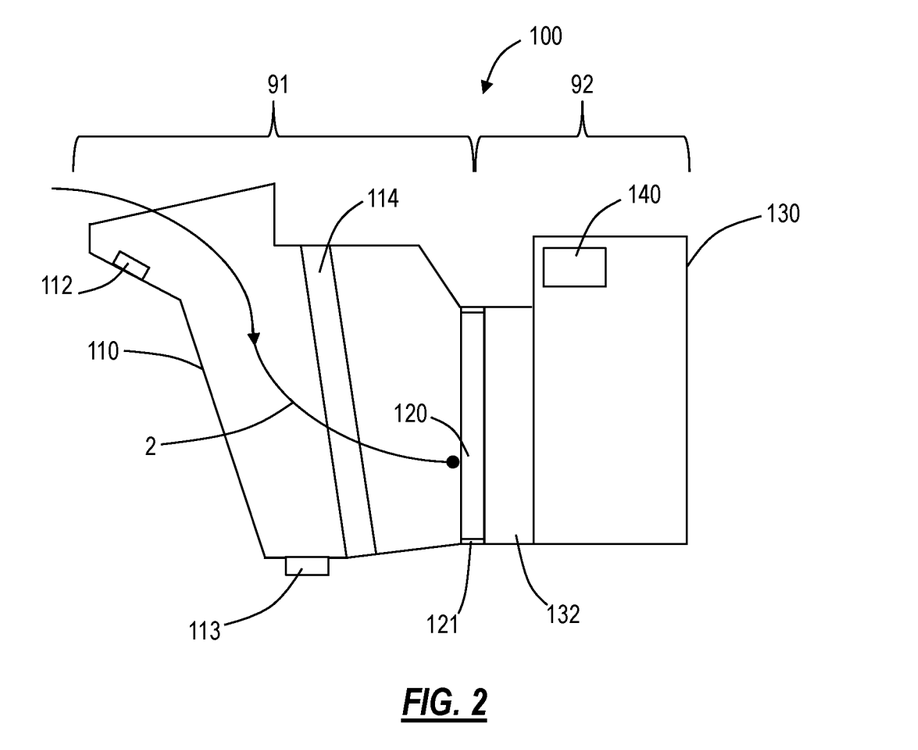
FIG. 2 is a schematic illustration of an illustrative embodiment of the airflow system of FIG. 1 highlighting a recirculation configuration of the airflow system.
Figure 3:
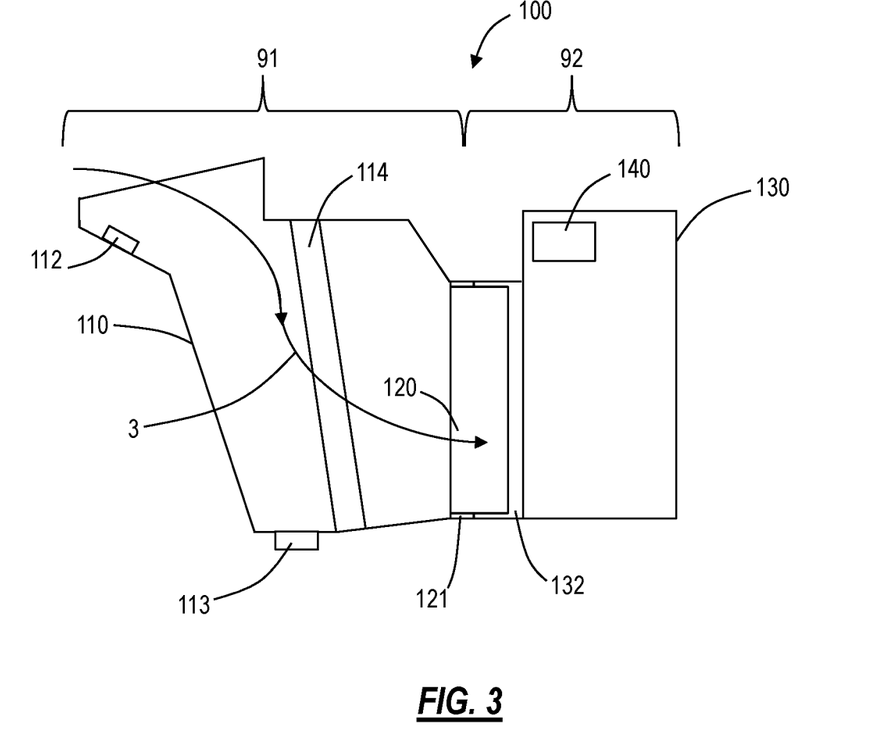
FIG. 3 is a schematic illustration of the illustrative embodiment of the airflow system of FIGS. 1 and 2 highlighting a non-circulation configuration of the airflow system.

Referring additionally to FIGS. 2 and 3, in various illustrative embodiments the airflow system 100 includes an airflow inlet duct 110, an airflow intake duct 132, an air intake door 120, and an airflow unit 130. The airflow inlet duct 110 is adapted to draw an airflow of outside, ambient air. In various embodiments, the airflow inlet duct 110 is adapted to draw the airflow of ambient air from the cowl 14. In various embodiments, the airflow inlet duct 110 includes one or more drain valves 113 positioned at a bottom thereof. The one or more drain valves 113 are adapted to drain water ingested into the airflow inlet duct 110. In various embodiments, the one or more drain valves 113 are on-way drain valves.

The airflow intake duct 132 is adapted to receive the airflow from the airflow inlet duct 110. In various embodiments, the airflow intake duct 132 is adapted to direct the airflow into the airflow unit 130. In various embodiments, the airflow intake duct 132 is the inlet of the airflow unit 130.

The air intake door 120 is positioned in a flow path of the airflow between the airflow inlet duct 110 and the airflow intake duct 132, such as at least partially between the airflow inlet duct 110 and the airflow intake duct 132. In various embodiments, the airflow system 100 includes a rubber seal 121, such as a rubber bulb seal, between the airflow intake duct 132 and the airflow inlet duct 110. The rubber seal 121 helps ensure that a water-tight seal is formed with the air intake door 120 upon the closing thereof.

In various embodiments, the air intake door 120 is a valve. In various embodiments, the air intake door 120 is positioned at an opening of a bulkhead to the cabin 20, where the portions of the airflow system 100 downstream of the air intake door 120 and bulkhead are considered to be part of a dry-zone 92 of the cabin 20, while the portions of the airflow system 100 upstream of the air intake door 120 and bulkhead are considered to be part of a potential wet-zone 91. In various embodiments, the dry-zone 92 includes the airflow intake duct 132, the airflow unit 130, and the vehicle cabin 20, and the wet-zone 91 includes the airflow inlet duct 110. In various embodiments, the air intake door 120 is located at the boundary between the wet-zone 91 and the dry-zone 92.

The airflow system 100 is configured to operate in multiple modes. The modes include a recirculation mode and one or more non-recirculation modes, such as a fresh-air mode and a combination mode. While in a recirculation mode, the airflow unit 130 only uses air from the cabin, which the airflow unit 130 recirculates therethrough without ingesting fresh-air. As can be seen in FIG. 2, in the recirculation mode, the air intake door 120 is in a closed condition which prevents fluids including ambient outside air and water from passing thereby. As can be seen in FIG. 2, fluid can flow into the wet-zone 91 along flow path 2, but is prevented from flowing into the dry-zone 92 by the air intake door 120.

In non-recirculation modes outside air is brought into the airflow system 100. As can be seen in FIG. 3, in the non-recirculation modes, the air intake door 120 is at least partially in an open condition which allows the outside air to pass therethrough. As can be seen in FIG. 3, fluid can flow into the wet-zone 91 and into the dry-zone 92, via the open air intake door 120, along flow path 3. In a fresh-air mode, the airflow unit 130 circulates fresh air in the cabin. In a combination mode, the airflow unit 130 circulates a combination of fresh air and recirculated cabin air.

In various embodiments, the airflow system 100 includes a filter 114. In various embodiments, such as the embodiment illustrated in FIGS. 1 and 2, the filter 114 is positioned in the airflow inlet duct 110 upstream of the air intake door 120. However, in various other embodiments, the filter 114 is positioned in the airflow inlet duct 132 downstream of the air intake door 120.

In various embodiments, the airflow unit 130 is adapted to receive the airflow from the airflow intake duct 132. In various embodiments, the airflow unit 130 is an automotive Heating, Venting, and Air Conditioning unit. In various embodiments, the airflow unit 130 includes a controller 140 configured to close the air intake door 120 and seal off the air intake duct 132 from the airflow inlet duct 110 in response to receipt of at least one signal indicating at least one condition chosen from 1) a presence of water in the airflow inlet duct 110, 2) the hood 12 of the vehicle being in an open condition, 3) a presence of rain detected by the precipitation sensor 16, and 4) activation of a predetermined speed setting of a windshield wiper 17 of the vehicle 10. In various illustrative embodiments, the presence of rain detected by the precipitation sensor 16 is based on the precipitation sensor 16 detecting a predetermined amount of rain. In various embodiments, the predetermined amount of rain is based on one or more of specific configurations of the vehicle and an intended local of the vehicle, and the like.

In various embodiments, the controller 140 is only configured to close the air intake door 120 and seal off the air intake duct 132 from the airflow inlet duct 110 upon receipt of a signal indicating one of the above conditions, such as a presence of water in the airflow inlet duct 110, while in other various embodiments, the controller 140 is configured to close the air intake door 120 and seal off the air intake duct 132 from the airflow inlet duct 110 in response to receipt of a signal indicating any of the above conditions.

In various embodiments, other conditions for triggering the closure of the air intake door 120 and the sealing off of the air intake duct 132 from the airflow inlet duct 110 are also contemplated, such as conditions where the vehicle is at least partially submerged in water (for example, crossing a stream of a certain depth, etc.) and the like.

In various embodiments, the airflow system 100 also includes a water detection sensor 112. In various embodiments, the signal indicating the presence of the water in the airflow inlet duct is provided by the water detection sensor 112 positioned in the airflow inlet duct 110.

In various embodiments, the water detection sensor 112 is one of a humidity sensor, a wetting sensor, and a water level sensor.

In various embodiments where the water detection sensor 112 is a humidity sensor, the presence of the water is determined by a humidity level of a predetermined amount being indicated by the water detection sensor 112. In various embodiments, the predetermined amount of humidity is one-hundred percent indicating a direct wetting of the water detection sensor 112, potentially further indicating water intrusion in the airflow inlet duct 110, and thereby triggering the closure of the air intake door 120. In various embodiments, the closure of the air intake door 120 occurs in 1-5 seconds. Notably, the predetermined amount of humidity should not be interpreted as limiting and other predetermined amounts may be configured/reconfigured ranging from eighty to one-hundred percent. Indeed, in other embodiments, the predetermined amount of humidity is a threshold value whereby the air intake door 120 is closed upon detecting the humidity to be one of at and over the predetermined amount.

Figure 4:
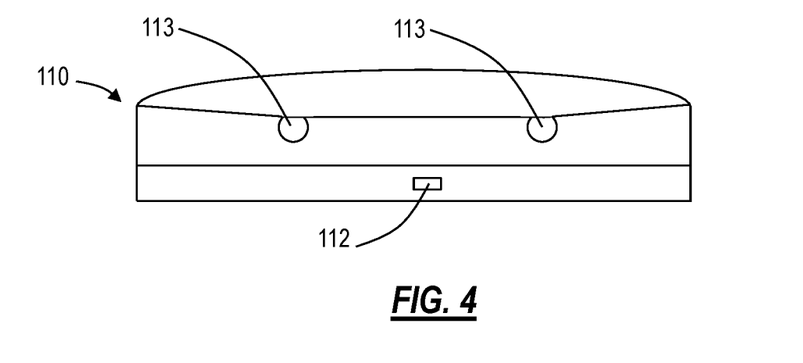
FIG. 4 is a schematic illustration of a top view of the airflow inlet duct of the airflow system of FIG. 2.

Referring additionally to FIG. 4, in various embodiments, the water detection sensor 112 is centrally positioned in the airflow inlet duct 110 adjacent to the cowl 14 of the vehicle 10.

Figure 5:
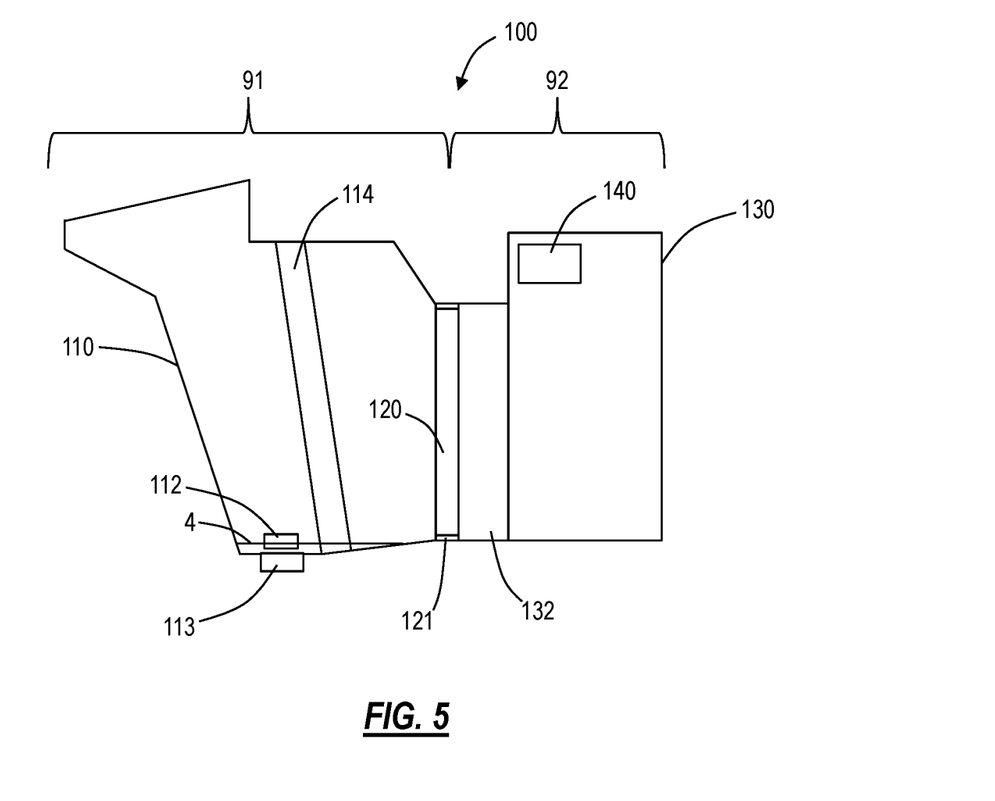
FIG. 5 is a schematic illustration of another illustrative embodiment of the airflow system of FIG. 1.

Referring additionally to FIG. 5, in various embodiments where the water detection sensor 112 is a water level sensor, the water detection sensor 112 is positioned at or adjacent to a bottom of the airflow inlet duct 110. In various embodiments, the water level sensor includes a plum-bob that indicates a water level 4 within the airflow inlet duct 110 and the presence of the water in the airflow inlet duct 110 is determined by the water level sensor indicating the water level 4 to be a predetermined amount.

In various embodiments, the controller 140 is also configured to set the airflow unit 130 into the recirculation mode in response to the receipt of the at least one signal indicating the at least one condition. In various embodiments, the determination that the at least one condition persists is based on receipt of further signals identifying the condition is occurring.

In various embodiments, the signal indicating that the hood 12 is in the open condition is received from a device chosen from 1) the hood sensor 13 indicating whether the hood 12 is in the open condition and the closed condition and 2) a release mechanism 18 adapted to release the hood 12 from the closed condition and into the open condition.

In various embodiments, the controller 140 is also configured to set driving mode settings in response to receipt of the at least one signal indicating the at least one condition. For example, upon detection of rain by the precipitation sensor 16, upon activation of the predetermined speed setting of a windshield wiper 17, or upon wetting of the water detection sensor 112, the controller 140 causes the driving mode to be changed to ensure a proper mode is set for wet/rainy road conditions.

In various embodiments, the controller 140 is also configured to close the air intake door 120 upon selection by an occupant of the vehicle. For example, the controller 140, in various embodiments, includes one or more vehicle modes, such as an offroading and water fording mode, where, upon selection, the controller 140 closes the air intake door 120.

Figure 6:
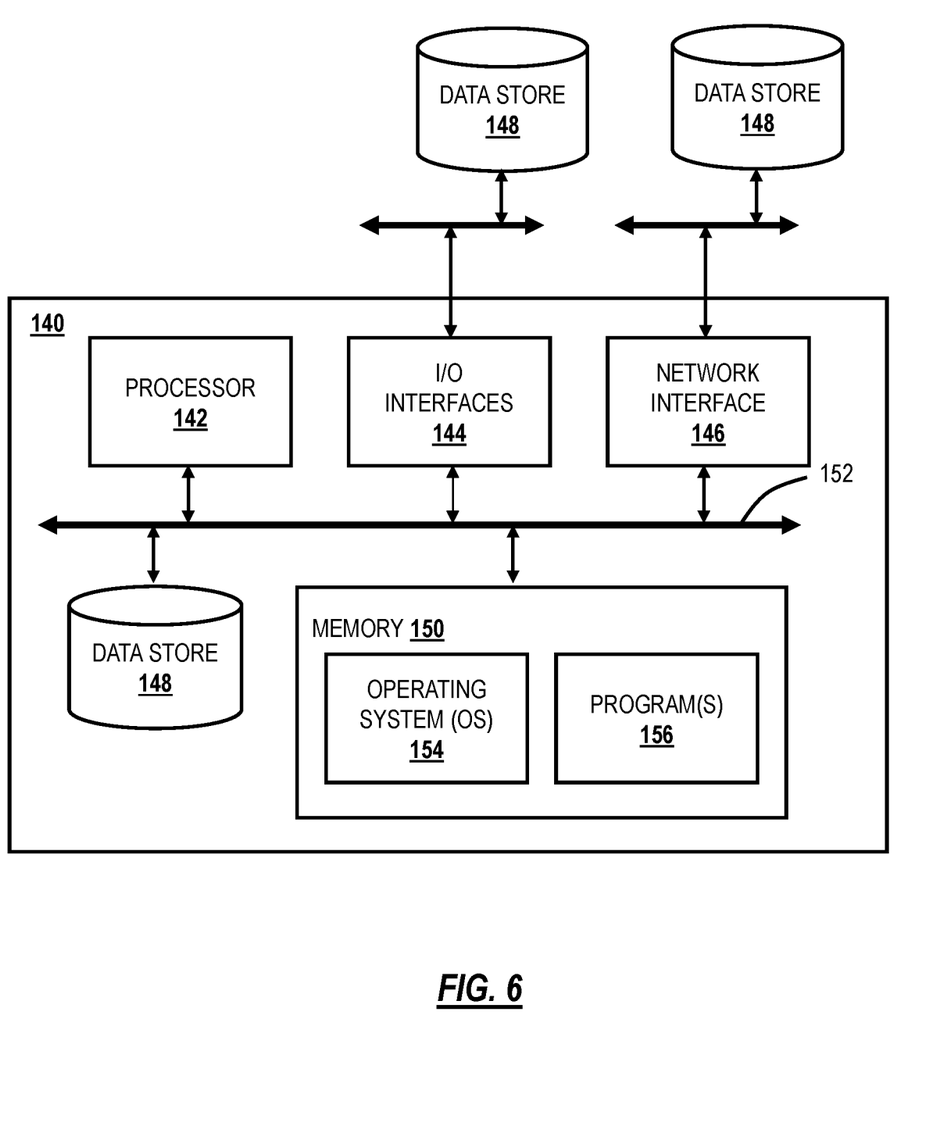
FIG. 6 is a block diagram illustrating an embodiment of the controller of the airflow system of FIGS. 1 and 2.

Referring additionally to FIG. 6, the controller 140 may be a digital computer that, in terms of hardware architecture, generally includes a processor 142, input/output (I/O) interfaces 144, a network interface 146, a data store 148, and memory 150. It should be appreciated by those of ordinary skill in the art that FIG. 6 depicts the controller 140 in an oversimplified manner, and a practical embodiment may include additional components and suitably configured processing logic to support known or conventional operating features that are not described in detail herein. The components (142, 144, 146, 148, and 150) are communicatively coupled via a local interface 152. The local interface 152 may be, for example, but not limited to, one or more buses or other wired or wireless connections, as is known in the art. The local interface 152 may have additional elements, which are omitted for simplicity, such as controllers, buffers (caches), drivers, repeaters, and receivers, among many others, to enable communications. Further, the local interface 42 may include address, control, and/or data connections to enable appropriate communications among the aforementioned components.

The processor 142 is a hardware device for executing software instructions. The processor 142 may be any custom made or commercially available processor, a central processing unit (CPU), an auxiliary processor among several processors associated with the controller 140, a semiconductor-based microprocessor (in the form of a microchip or chipset), or generally any device for executing software instructions. When the controller 140 is in operation, the processor 142 is configured to execute software stored within the memory 150, to communicate data to and from the memory 150, and to generally control operations of the controller 30 pursuant to the software instructions. The I/O interfaces 144 may be used to receive user input from and/or for providing system output to one or more devices or components. The user input may be provided via, for example, a keyboard, touchpad, and/or a mouse. System output may be provided via a display device. I/O interfaces 144 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 146 may be used to enable the controller 30 to communicate on a network. The network interface 146 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 146 may include address, control, and/or data connections to enable appropriate communications on the network. A data store 148 may be used to store data. The data store 38 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 148 may incorporate electronic, magnetic, optical, and/or other types of storage media. In one example, the data store 38 may be located internal to the controller 140, such as, for example, an internal hard drive connected to the local interface 152 in the controller 140. Additionally, in another embodiment, the data store 148 may be located external to the controller 140 such as, for example, an external hard drive connected to the I/O interfaces 144 (e.g., SCSI or USB connection).

The memory 150 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 150 may incorporate electronic, magnetic, optical, and/or other types of storage media. Note that the memory 150 may have a distributed architecture, where various components are situated remotely from one another, but can be accessed by the processor 142. The software in memory 150 may include one or more software programs, each of which includes an ordered listing of executable instructions for implementing logical functions. The software in the memory 150 includes a suitable operating system (O/S) 154 and one or more programs 156. The operating system 154 essentially controls the execution of other computer programs, such as the one or more programs 156, and provides scheduling, input-output control, file and data management, memory management, and communication control and related services. The one or more programs 46 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
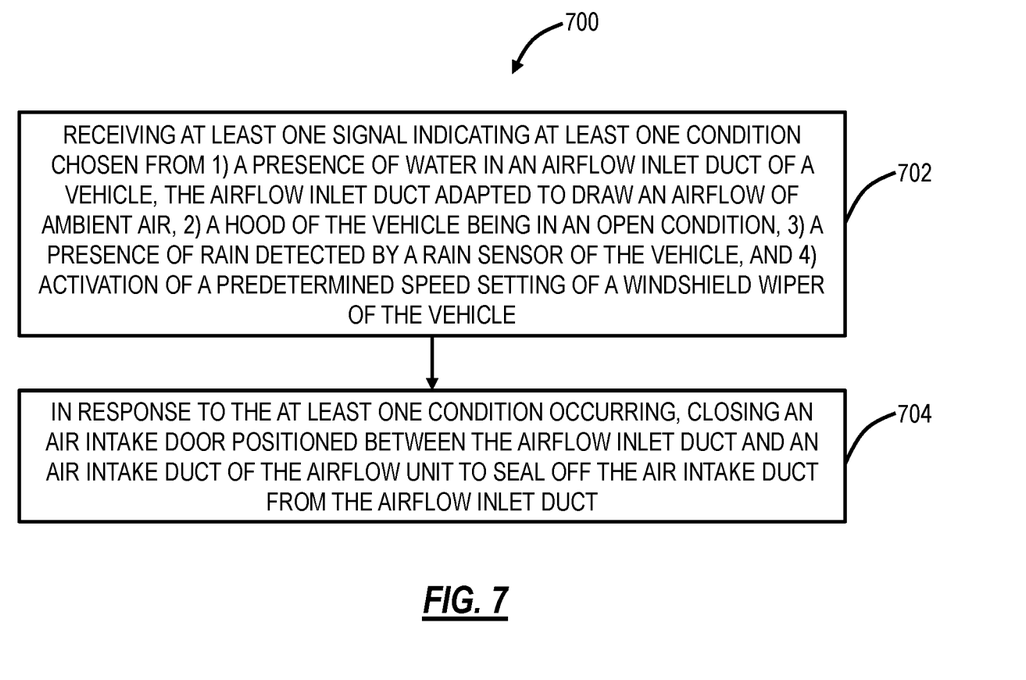
FIG. 7 is a flowchart of a method for preventing water intrusion into a cab of the vehicle.

Referring additionally to FIG. 7, an illustrative method 700 for preventing water intrusion into a cab of a vehicle 10 is provided. The method 700 includes receiving at least one signal indicating at least one condition chosen from 1) a presence of water in an airflow inlet duct of a vehicle, the airflow inlet duct adapted to draw an airflow of ambient air, 2) a hood of the vehicle being in an open condition, 3) a presence of rain detected by a precipitation sensor of the vehicle, and 4) activation of a predetermined speed setting of a windshield wiper of the vehicle at step 702.

The method 700 also includes, in response to the at least one condition occurring, closing an air intake door positioned between the airflow inlet duct and an air intake duct of the airflow unit to seal off the air intake duct from the airflow inlet duct at step 704.

In various embodiments, the method 700 further includes setting the airflow unit into a recirculation mode in response to the at least one condition occurring. In various embodiments, the method 700 yet further includes preventing the airflow unit from being set to a non-recirculation mode while the at least one condition persists.

In various embodiments, the method 700 is implemented by the processor executing the computer-executable instructions stored on the memory, which causes the processor to perform the steps of the method.

Again, the air intake door is closed and sealed in response to the receipt of a signal indicating at least one of the conditions discussed above. By so doing the airflow system can be sealed and reduce the risk of water entering the dry-zone 92 of the cabin thereby. Thus, in circumstances where other water management features, such as the one or more valves 113, might be overloaded, the air intake door 120 is closed to form a seal between the dry-zone 92 and the potential wet-zone 91 of the airflow system 100. Such overload conditions may occur from torrential rains and while the vehicle is being washed, such as while water is directed towards the cowl 17. Furthermore, while the hood 12 is in the open condition, the positioning of the hood 12 might direct any water sprayed thereon towards the cowl 17, which could increase the likelihood of an overload condition occurring. Thus, by closing the air intake door 120 while the hood is open, protection from ingestion of water into the airflow unit 130 can be prevented as the air intake door 120 is sealed upon the opening of the hood 12.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term processor, as used in the foregoing/following disclosure, may refer to a collection of one or more components (such as computer processors and their components) that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of processor (e.g., at a first time), as a second type of processor (e.g., at a second time, which may in some instances coincide with, overlap, or follow a first time), and/or as a third type of processor (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first processor that has a first purpose, then a second processor that has a second purpose and then, a third processor that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different component in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An airflow system of a vehicle, comprising:
an airflow intake duct adapted to receive airflow from an airflow inlet duct;
an air intake door positioned at least partially between the airflow inlet duct and the airflow intake duct; and
an airflow unit adapted to receive the airflow from the airflow intake duct, the airflow unit including a controller configured to close the air intake door and seal off the air intake duct from the airflow inlet duct in response to receipt of at least one signal indicating at least one condition chosen from a presence of water in the airflow inlet duct, a hood of the vehicle being in an open condition, or activation of a predetermined speed setting of a windshield wiper.

2. The airflow system of claim 1, wherein the at least one condition comprises the presence of water in the airflow inlet duct, wherein the at least one signal indicating the presence of the water in the airflow inlet duct is provided by a water detection sensor positioned in the airflow inlet duct, and wherein the presence of water is determined by a humidity level of a predetermined amount being indicated by water detection sensor.

3. The airflow system of claim 2, wherein the predetermined amount of humidity, indicates a direct wetting of the water detection sensor.

4. The airflow system of claim 2, wherein the water detection sensor is centrally positioned in the airflow inlet duct adjacent to a cowl of the vehicle.

5. The airflow system of claim 1, wherein the controller is further configured to set the airflow unit into a recirculation mode in response to the receipt of the at least one signal indicating the at least one condition.

6. The airflow system of claim 5, wherein the controller is configured to prevent the airflow unit from being set to a non-recirculation mode while the at least one condition persists.

7. The airflow system of claim 1, wherein the at least one signal indicating that the hood is in the open condition is received from a device chosen from 1) a hood sensor indicating whether the hood is in the open condition and a closed condition and 2) a release mechanism adapted to release the hood from the closed condition and into the open condition.

8. A vehicle comprising:
an airflow intake duct adapted to receive airflow from an airflow inlet duct;
an air intake door positioned at least partially between the airflow inlet duct and the airflow intake duct; and
an airflow unit adapted to receive the airflow from the airflow intake duct; and
a controller configured to:
close the air intake door and seal off the air intake duct from the airflow inlet duct in response to receipt of at least one signal indicating at least one condition chosen from a presence of water in the airflow inlet duct, or a presence of rain detected by a precipitation sensor of the vehicle, and set, based on the air intake door being closed, the airflow unit into a recirculation mode in response to the receipt of the at least one signal indicating the at least one condition.

9. The vehicle of claim 8, wherein the at least one condition comprises the presence of water in the airflow inlet duct, wherein the signal indicating the presence of the water in the airflow inlet duct is provided by a water detection sensor positioned in the airflow inlet duct, and wherein the presence of the water is determined by a humidity level of a predetermined amount being indicated by the water detection sensor.

10. The vehicle of claim 9, wherein the predetermined amount of the humidity indicates a direct wetting of the water detection sensor.

11. The vehicle of claim 9, wherein the water detection sensor is centrally positioned in the airflow inlet duct adjacent to a cowl of the vehicle.

12. The vehicle of claim 8, wherein the controller is configured to prevent the airflow unit from being set to a non-recirculation mode while the at least one condition persists.

13. The vehicle of claim 8, wherein the at least one condition further comprises a hood being in an open condition, and the signal indicating that the hood is in the open condition is received from a device chosen from 1) a hood sensor indicating whether the hood is in the open condition and a closed condition and 2) a release mechanism adapted to release the hood from the closed condition and into the open condition.

14. The vehicle of claim 8, wherein the at least one condition comprises activation of a predetermined speed setting of a windshield wiper of the vehicle.

15. A controller of an airflow unit, the controller comprising;
    a processor; and
    memory storing computer-executable instructions that, when executed, cause the processor to:
    receive, from a water level sensor in an airflow inlet duct, at least one signal indicating a presence of water in the airflow inlet duct of a vehicle, the airflow inlet duct adapted to draw an airflow of ambient air; and
    in response to receipt of the at least one signal, close an air intake door positioned between the airflow inlet duct and an air intake duct of the airflow unit to seal off the air intake duct from the airflow inlet duct.

16. The controller of claim 15, wherein the signal indicating the presence of the water in the airflow inlet duct is received from a water detection sensor positioned in the airflow inlet duct, and wherein the presence of the water is determined by a humidity level of a predetermined amount being indicated by the water detection sensor.

17. The controller of claim 16, wherein the predetermined amount of humidity indicates a direct wetting of the water detection sensor.

18. The controller of claim 15, wherein the memory storing computer-executable instructions that, when executed, further cause the processor to:
    set the airflow unit into a recirculation mode in response to receipt of the signal.

19. The controller of claim 15, wherein the memory storing computer-executable instructions that, when executed, further cause the processor to:
    close the air intake door in response to receipt of another signal indicating any of 1) a hood of the vehicle being in an open condition, 2) a presence of rain detected by a precipitation sensor of the vehicle, and 3) activation of a predetermined speed setting of a windshield wiper of the vehicle.

20. The controller of claim 19, wherein the signal indicating that the hood is in the open condition is received from a device chosen from 1) a hood sensor indicating whether the hood is in the open condition and a closed condition and 2) a release mechanism adapted to release the hood from the closed condition and into the open condition.

* * * * *

UNITED STATES PATENT AND TRADEMARK OFFICE
CERTIFICATE OF CORRECTION

| | |
|---|---|
| PATENT NO. | : 12,011,971 B2 |
| APPLICATION NO. | : 17/380146 |
| DATED | : June 18, 2024 |
| INVENTOR(S) | : Sameh Khan et al. |

It is certified that error appears in the above-identified patent and that said Letters Patent is hereby corrected as shown below:

In the Claims

Column 12, Line 34 (Claim 3): "of humidity, indicates" should read --of humidity indicates--;

Column 13, Lines 35-36 (Claim 15): "the controller comprising;" should read --the controller comprising:--.

Signed and Sealed this
Third Day of September, 2024

Katherine Kelly Vidal
*Director of the United States Patent and Trademark Office*